(12) United States Patent
Hofmann et al.

(10) Patent No.: US 11,866,102 B2
(45) Date of Patent: Jan. 9, 2024

(54) SPOILER APPARATUS, VEHICLE HAVING SUCH A SPOILER APPARATUS AND METHOD FOR OPERATING THE SPOILER APPARATUS

(71) Applicants: Andre Hofmann, Wolfsburg (DE); Volkswagen Aktiengesellschaft, Wolfsburg (DE)

(72) Inventors: Andre Hofmann, Wolfsburg (DE); Marcel Klopp, Wolfsburg (DE); Ingo Lanfer, Wolfsburg (DE)

(73) Assignees: Andre Hofmann, Wolfsburg (DE); Volkswagen Aktiengesellschaft, Wolfsburg (DE)

( * ) Notice: Subject to any disclaimer, the term of this patent is extended or adjusted under 35 U.S.C. 154(b) by 119 days.

(21) Appl. No.: 17/298,133

(22) PCT Filed: Nov. 26, 2019

(86) PCT No.: PCT/DE2019/101014
§ 371 (c)(1),
(2) Date: May 28, 2021

(87) PCT Pub. No.: WO2020/108703
PCT Pub. Date: Jun. 4, 2020

(65) Prior Publication Data
US 2022/0017159 A1     Jan. 20, 2022

(30) Foreign Application Priority Data
Nov. 28, 2018   (DE) .......................... 102018220484.5

(51) Int. Cl.
B62D 35/00     (2006.01)
B62D 37/02     (2006.01)

(52) U.S. Cl.
CPC ........... *B62D 35/007* (2013.01); *B62D 37/02* (2013.01)

(58) Field of Classification Search
CPC ........ B62D 35/007; B62D 37/02; Y02T 10/82
See application file for complete search history.

(56) References Cited

U.S. PATENT DOCUMENTS

| 4,674,788 A | 6/1987 | Ohmura et al. |
| 4,886,312 A | 12/1989 | Asoh |

(Continued)

FOREIGN PATENT DOCUMENTS

| CN | 101585378 A | 11/2009 |
| CN | 105501314 A | 4/2016 |

(Continued)

*Primary Examiner* — Lori Lyjak
(74) *Attorney, Agent, or Firm* — Laurence A. Greenberg; Werner H. Stemer; Ralph E. Locher

(57) ABSTRACT

A spoiler apparatus for a vehicle has a spoiler blade that is pivotally mounted about a transverse vehicle axis. An electric motor moves the spoiler blade between operating positions. The spoiler blade has a first mounting location on each end and is pivotally mounted there on the spoiler housing by way of a hinge. The hinges are advantageously each formed by an arched hinge lever, the hinge lever being rotatably mounted on one end on the spoiler housing fixed to the vehicle and mounted on the other end on the spoiler blade for conjoint rotation. Viewed transversely to the direction of the vehicle, the electric motor is fixed on the spoiler housing between the first mounting locations and, by way of a toggle lever mechanism, is operatively connected thereto in a second mounting location of the spoiler blade.

13 Claims, 3 Drawing Sheets

(56) References Cited

U.S. PATENT DOCUMENTS

| | | | |
|---|---|---|---|
| 5,454,619 | A | 10/1995 | Haraway |
| 6,030,028 | A | 2/2000 | Radmanic et al. |
| 7,481,482 | B2 | 1/2009 | Grave et al. |
| 7,540,554 | B2 | 6/2009 | Bals |
| 7,708,335 | B2 | 5/2010 | Wegener |
| 8,177,288 | B2 | 5/2012 | Molnar et al. |
| 2007/0145776 | A1 | 6/2007 | Grave et al. |

FOREIGN PATENT DOCUMENTS

| | | | | |
|---|---|---|---|---|
| CN | 105691474 B | * | 3/2018 | ............. B60R 13/04 |
| DE | 4207658 A1 | | 9/1993 | |
| DE | 19732698 C1 | | 7/1998 | |
| DE | 10136323 A1 | | 2/2003 | |
| DE | 10309369 A1 | | 9/2004 | |
| DE | 102005021832 A1 | | 11/2006 | |
| DE | 102008024891 A1 | | 11/2009 | |
| DE | 202011002434 U1 | | 6/2011 | |
| DE | 102010011676 B4 | | 7/2012 | |
| DE | 102011081899 A1 | * | 2/2013 | ........... B62D 35/007 |
| KR | 100292774 B1 | * | 9/2001 | ............. B62D 37/02 |
| KR | 101369434 B1 | | 3/2014 | |
| WO | 2004065740 A1 | | 8/2004 | |

\* cited by examiner

SPOILER APPARATUS, VEHICLE HAVING SUCH A SPOILER APPARATUS AND METHOD FOR OPERATING THE SPOILER APPARATUS

BACKGROUND OF THE INVENTION

Field of the Invention

The invention relates to a spoiler apparatus for a vehicle, in particular a motor vehicle, with a spoiler blade (5) which extends in the vehicle transverse direction (y-direction), is mounted such that it can be pivoted about a vehicle transverse axis on the vehicle body or a spoiler housing which is fixed on the vehicle, and can be transferred by means of an electric motor in an active manner from a first operating position into at least one second operating position and back. The spoiler blade has, at both ends, in each case one first bearing point and is mounted there on the vehicle body or on the spoiler housing such that it can be pivoted via in each case one hinge. As claimed, said invention relates, furthermore, to a vehicle, in particular a motor vehicle, with a spoiler apparatus of this type. In accordance with the combination of features, said invention relates, furthermore, to a method for operating the spoiler apparatus.

DE 101 36 323 A1 has disclosed a notchback vehicle with an actively deployed spoiler device which comprises two spoiler elements which are arranged at the two lateral ends of the vehicle. The two spoiler elements can be actuated in an infinitely variable manner between a rest position and a maximum extended position separately from one another via a regulating device and control devices which are connected to the latter, in a manner which is dependent on parameters, such as, for example, the yaw rate, of the chassis kinematics and/or the speed of the vehicle. The spoiler elements are articulated on the body of the vehicle such that they can be pivoted about a rotational axis, and can be adjusted by means of in each case one associated adjusting apparatus. The respective adjusting apparatus comprises a four-bar linkage which has two struts which are connected to one another in each case via a common joint. Via further joints, the outer ends of the struts, which outer ends are spaced apart from the respective common joint, are fastened firstly to the inner face of the respective spoiler element and secondly to the vehicle body. The adjusting apparatus is adjusted by means of an actuable drive, such as an electric motor. DE 10 2005 021 832 A1 describes an air guiding apparatus of a vehicle with a spoiler which is fastened to a spoiler base and with an adjusting device for the adjustment of the spoiler base between a rest position, in which the spoiler lies substantially in the vehicle contour, and at least one first operating position, in which the spoiler is deployed above the vehicle contour. The adjusting device comprises a pivoting link arrangement which is articulated on the spoiler base. Furthermore, a second operating position is provided, in which the spoiler is deployed even further beyond the first operating position during driving and thus provides a braking effect (air brake function). Moreover, an infinitely variable adjustment of the spoiler can also be provided. As viewed in the vehicle transverse direction, the adjusting device is arranged in the center of the vehicle.

Moreover, two adjusting devices can also be provided symmetrically with respect to a vertical vehicle longitudinal center plane. The adjusting device is operated by means of an electric motor, for example, in a manner which is dependent on a brake pedal position. WO 2004/065740 A1 describes a hinge for a part which is articulated on a vehicle, such as a vehicle hatch, comprising a first hinge part which can be fastened to one of the door arrangement parts of hatch or hatch frame, a second hinge part which can be fastened to the respective other door arrangement part, a hinge pin which connects the first and the second hinge part to one another such that they can be pivoted about a pivoting axis, and a lever arrangement which couples the first hinge part to the second hinge part. The lever arrangement comprises at least one first lever, said first lever being connected pivotably to the hinge part which is arranged on the hatch. Moreover, a holder for a motor is provided on the hinge part which is arranged on the hatch, it being possible for the first lever to be driven rotationally by said motor. In the case of motorized opening or closing of the vehicle hatch, braking of the latter is provided. The precise position of the hatch is detected by way of a sensor, for example in the form of a potentiometer which is installed in one of the pivoting joints. Said document WO 2004/065740 A1 also includes, inter alia, an adjustable spoiler.

SUMMARY OF THE INVENTION

It is an object of the invention to provide a spoiler apparatus which is further improved with regard to the prior art and the complexity of which is minimized. Furthermore, it is an object of the invention to provide a vehicle, in particular a motor vehicle, with a spoiler apparatus of this type. Furthermore, it is an object of the invention to indicate a method for operating the spoiler apparatus.

Proceeding from a spoiler apparatus for a vehicle, in particular a motor vehicle, with a spoiler blade which extends in the vehicle transverse direction (y-direction), is mounted such that it can be pivoted about a vehicle transverse axis on the vehicle body or a spoiler housing which is fixed on the vehicle, and can be transferred by means of an electric motor in an active manner from a first operating position into at least one second operating position and back, the spoiler blade having, at both ends, in each case one first bearing point and being mounted there on the vehicle body or on the spoiler housing such that it can be pivoted via in each case one hinge, the object which is set is achieved by virtue of the fact that the hinges for pivotable mounting of the spoiler blade on the vehicle body or the spoiler housing which is fixed on the vehicle are formed by way of in each case one hinge lever of arcuate configuration, which hinge levers are mounted at one end rotatably on the vehicle body or on the spoiler housing which is fixed on the vehicle and at the other end are mounted non-rotatably on the spoiler blade, and that, as viewed in the vehicle transverse direction (y-direction), the electric motor is fixed on the vehicle body or on the spoiler housing which is fixed on the vehicle between said first bearing points, and is operatively connected to the spoiler blade by means of a toggle lever mechanism at a second bearing point of said spoiler blade.

An overall design of the spoiler apparatus which is particularly flat and accordingly reduces installation space is made possible or achieved by way of the provided hinge system which comprises hinge levers of arcuate configuration (also occasionally called gooseneck hinges in the expert field) and in combination with the toggle lever mechanism for the driving attachment of the electric motor to the spoiler blade.

The subclaims describe preferred developments or refinements of the invention.

In accordance with one particularly practical embodiment of said toggle lever mechanism, it is provided that said toggle lever mechanism has a first lever which is connected fixedly to an output shaft for conjoint rotation, which first lever is connected at the other end in an articulated manner to an end of a second lever, the other end of the second lever being connected in an articulated manner to the spoiler blade at the second bearing point of said spoiler blade. Here, the first lever is advantageously configured in the shape of a U-profile with a web which connects two side flanks among one another which are arranged spaced apart from one another, the web having a bore for fixedly attaching the output shaft for conjoint rotation, and the side flanks having bores which correspond among one another for the articulated connection of the second lever by means of a pin. A particularly stable and space-saving configuration of the toggle lever mechanism is to be noted as a result. Here, the second lever is preferably arranged between said side flanks, and takes up the distance between them completely as far as possible without impeding the required joint agility. As the invention further provides, the first end of the hinge lever of arcuate configuration (gooseneck hinge), which first end faces the spoiler blade and can be connected fixedly to the latter for conjoint rotation by way of a screw connection, preferably has at least one means for positioning the hinge lever relative to the spoiler blade. As a result, a precision orientation of the spoiler blade on the hinge relative to the contour of the vehicle body and/or the spoiler housing is made possible in an extremely comfortable manner. In accordance with one particularly simple and functionally reliable embodiment of the invention, the means for positioning is formed by way of a slot in the hinge lever for said screw connection thereof to the spoiler blade and by way of an end-side, concave, first contour of the hinge lever, which first contour corresponds with the convex, second contour of the spoiler blade or vice versa. As the invention further provides, the electric motor is preferably connected to an electronic control and regulating unit (ECU), and can be regulated and controlled in defined steps or in an infinitely variable manner in a manner which is dependent on system parameters which are stored in software of said electronic control and regulating device (ECU) and on currently sensed driving states of the vehicle. In order to be able to sufficiently ensure said regulating and control function of the electronic control and regulating unit (ECU) for the electric motor and a safety function in the case of any malfunctions of the system to be recorded, the spoiler apparatus has means for displacement detection and/or end stops for position detection of the spoiler blade, which means for displacement detection and/or end stops generate signals which are likewise made available to the control and regulating unit (ECU) for the evaluation and generation of regulating and control signals for the electric motor.

The invention also relates to a vehicle, in particular a motor vehicle, with a spoiler apparatus of the above-described type.

The method for operating a spoiler apparatus of the above-described type is distinguished substantially by the fact that system parameters of the control and regulating unit (ECU) are designed in such a way that the adjustment of the spoiler blade is carried out both in a speed-dependent manner and in accordance with the degree of retardation of the vehicle, at least one step for the driving operation of the vehicle and, in addition, a further step in the case of maximum retardation of the vehicle being provided with regard to an adjustment of the spoiler blade in defined steps, an adjustment of the spoiler blade from one step to the other, that is to say both to the higher step and to the lower step, taking place only when the relevant speed range is maintained for a predefined time of at least 5 seconds, in the case where the vehicle enters into an emergency braking situation with a maximum retardation, the adjustment of the spoiler blade taking place directly into the further step independently of the current step to be recorded of the spoiler blade, which further step is associated with a maximum adjusting angle and a maximum air resistance.

Three steps preferably are preferably provided for the driving operation of the vehicle, however, in such a way that, in the range from the standstill of the vehicle up to approximately 120 km/h driving speed of said vehicle, the spoiler blade is situated in a first operating position which corresponds to the basic position thereof ("step 0"), that, between approximately 120 km/h and approximately 150 km/h, the angle of attack of the spoiler blade is increased, and said spoiler blade is situated in a second operating position which corresponds to a "step 1", that, between approximately 150 km/h and approximately 180 km/h, the angle of attack of the spoiler blade is increased further, and said spoiler blade is situated in a third operating position which corresponds to a "step 2", and that, from 180 km/h, the angle of attack of the spoiler blade is increased yet further, and said spoiler blade is situated in a third operating position which corresponds to a "step 3".

These are joined by the further step ("step 4") of the spoiler blade, which step is associated with a maximum adjusting angle and a maximum air resistance of said spoiler blade.

The above-described method has, in particular, also the advantage that, with regard to the feature indicated after the first dash, in the case of a "sporty" driving style, that is to say a driving style with a rapid and repetitive speed change, the adjustment of the spoiler blade is reduced to a necessary minimum which leads to minimized wear of all the components.

In order to protect the system against damage, it is advantageously provided in one development of the method according to the invention that, in the case of an undefined deviation of the system from defined system parameters and stipulations, the adjustment of the spoiler blade is stopped and the system is set into a "malfunction" mode. In combination with the above measure or on its own, it can be provided, furthermore, that the current consumption of the electric motor is measured and evaluated continuously and, in the case of a deviation or a trend of a deviation of the measured values from predefined values, the adjusting system for the spoiler blade is immediately switched off and is set into said "malfunction" mode, the "malfunction" mode being announced to the vehicle driver acoustically and/or visually in both cases. Causes of malfunctions of this type can be, for example, mechanical and/or electronic damage of system components or in the system, foreign bodies in the adjustment region of the spoiler blade and/or the like.

In the following text, the invention will be described in greater detail on the basis of one exemplary embodiment which is shown diagrammatically in the drawings. It is not restricted to said exemplary embodiment, however, but rather includes all the refinements which are defined by the patent claims. For the purposes of the present description, the customary driving direction of a motor vehicle is to be denoted by "−x" ("minus x"), the direction counter to its customary driving direction is to be denoted by "+x" ("plus x"), starting from the customary driving direction (−x) the direction in the horizontal transversely with respect to the x-direction to the right is to be denoted by "+y", starting from the customary driving direction (−x) the direction in the horizontal transversely with respect to the x-direction to the left is to be denoted by "−y", the direction in the vertical transversely with respect to the x-direction in the upward direction is to be denoted by "+z", and the direction in the vertical transversely with respect to the x-direction in the downward direction is to be denoted by "−z". This terminology of the spatial directions in Cartesian coordinates corresponds to the coordinate system which is generally used in the automotive industry. Moreover, terms such as "front", "rear", "top", "bottom" and terms with a similar meaning including the terms "right" and "left" are used in the way they are usually used for directional designations in a motor vehicle. In the drawings:

DETAILED DESCRIPTION OF THE INVENTION

Figure 1:
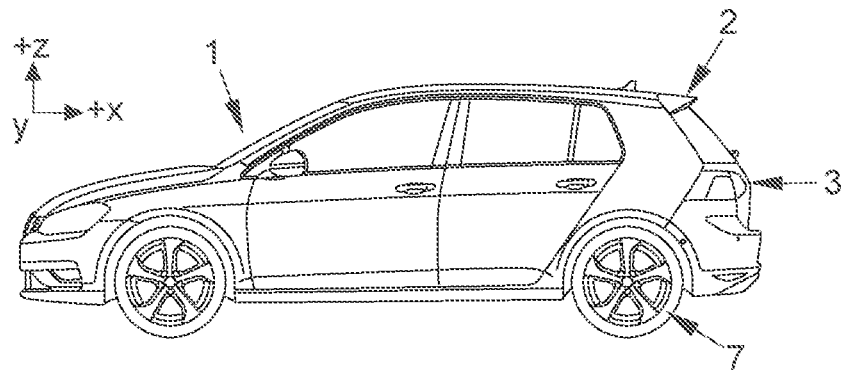
FIG. 1 extremely diagrammatically shows a side view of a vehicle which is equipped with the spoiler apparatus according to the invention.
Figure 2:
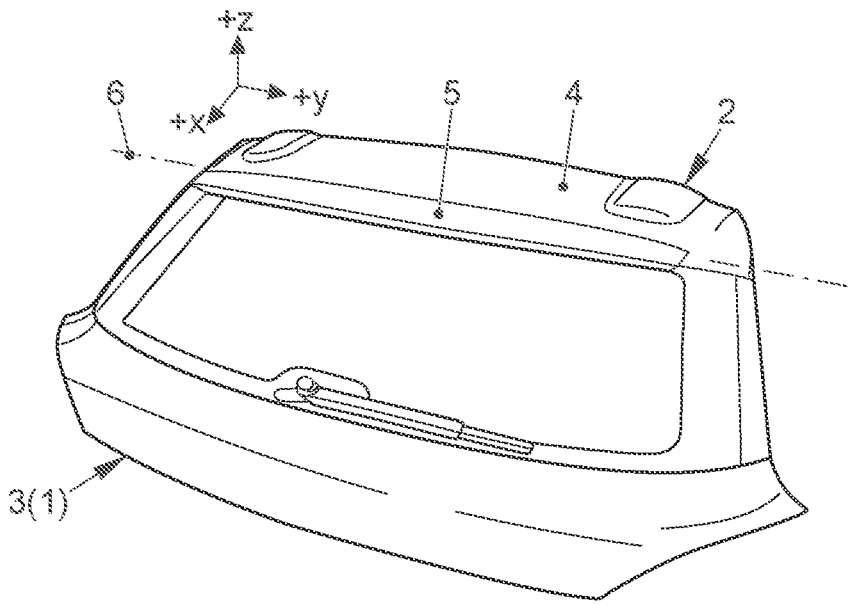
FIG. 2 shows a rear view of the rear hatch of the vehicle according to FIG. 1 with the spoiler apparatus fastened to it including an adjustable spoiler blade thereof in a first operating or basic position thereof.

FIG. 1 first of all shows a vehicle 1, a passenger motor vehicle with a hatchback in the present case, with a spoiler apparatus 2 which is fastened to a rear hatch 3 in the roof region of said rear hatch 3. As can further be gathered from FIGS. 1 to 3, the spoiler apparatus 2 has a spoiler housing 4 which is arranged directly on the rear hatch 3, as it were in a fixed manner on the body, on which spoiler housing 4 a spoiler blade 5 which extends in the vehicle transverse direction (y-direction) is mounted such that it can be pivoted about a vehicle transverse axis 6. As could already be gathered from the introduction to the description, the spoiler apparatus 2 or its spoiler blade 5 serves to influence the aerodynamics of the vehicle 1, in particular at high driving speeds, in order to provide the vehicle rear with downforce and thus, inter alia, also to improve the traction of the vehicle wheels 7.

The spoiler blade 5 can be transferred by means of an electric motor 8 in an active manner from a first operating position (cf. FIGS. 1 and 2) which corresponds to a basic position of the spoiler blade 5 at relatively low driving speeds of up to 120 km/h into at least one second operating position (cf. FIG. 3) which is set at a driving speed of 120 km/h, and back. The spoiler blade 5 is set at a steeper angle in said second operating position than in the first or basic position thereof, as a result of which the downforce of the vehicle rear is intensified.

Figure 3:
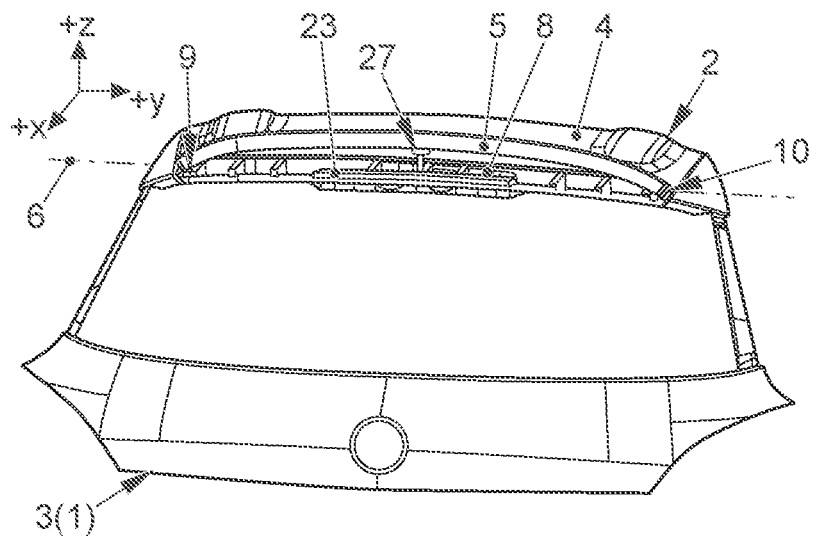
FIG. 3 shows the view according to FIG. 2 with the spoiler blade in an operating position which differs from the first operating position.
Figure 4:
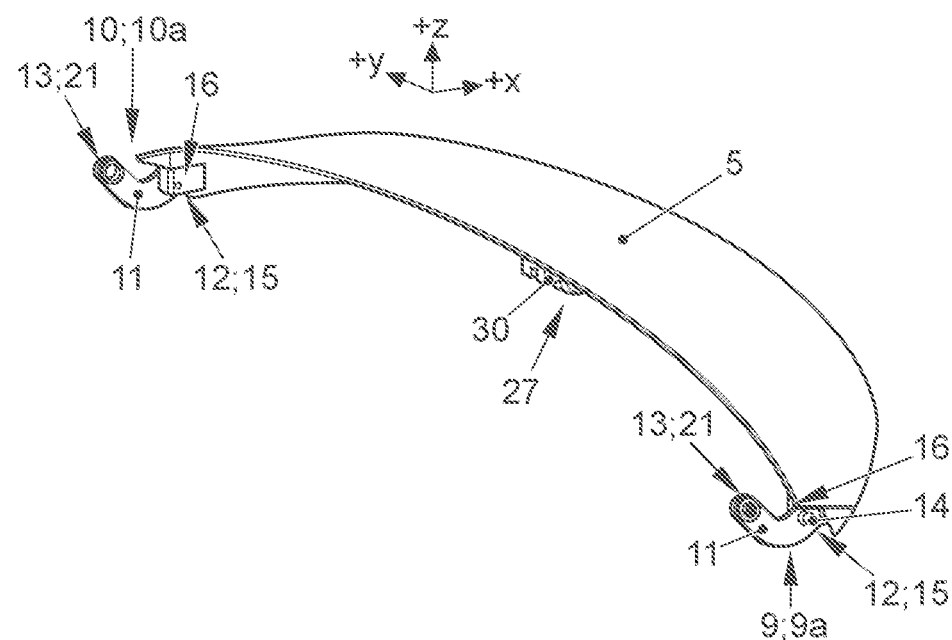
FIG. 4 shows a perspective individual view of the spoiler blade including hinges thereof.

As can further be gathered from FIGS. 3 and 4, the spoiler blade 5 has, at the two ends, in each case one first bearing point 9, 10 with in each case one hinge 9a, 10a, by means of which the spoiler blade 5 is mounted on the spoiler housing 4 such that it can be pivoted about said vehicle transverse axis 6. Each hinge 9a, 10a is formed solely by way of an arcuate hinge lever 11 (in the present case, bent twice), which hinge 9a, 10a is also occasionally called a gooseneck hinge 9a, 10a in the expert field.

Each hinge lever 11 is mounted at one end rotatably on the spoiler housing 4 and at the other end fixedly on the spoiler blade 5 for conjoint rotation. FIG. 4 shows substantially the fixed mounting 12 of the hinge levers 11 on the spoiler blade 5 for conjoint rotation, whereas FIG. 5 shows substantially the rotatable mounting 13 of the hinge levers 11 on the spoiler housing 4.

The fixed mounting 12 of each hinge lever 11 on the spoiler blade 5 for conjoint rotation is brought about by way of a fixed screw connection 14 of that first end 15 of the hinge lever 11 which faces the spoiler blade 5 to a bearing seat 16 of the spoiler blade 5 for conjoint rotation. Said first end 15 of the hinge lever 11 can also be seen very clearly in FIG. 5. In order to make a precision orientation of the spoiler blade 5 on the hinge 9a, 10a or the relevant hinge lever 11 relative to the contour of the vehicle body and/or the spoiler housing 4 possible in a comfortable manner, means 17a, 17b for positioning are provided. Here, a means 17a for positioning is formed by way of a slot in the hinge lever 11, which slot is penetrated by a fastening screw 18 (cf. FIG. 4) for the fixed connection of the hinge lever 11 to the spoiler blade 5 for conjoint rotation. The further means 17b for positioning is formed by way of an end-side, concave, first contour 19 of said first end 15 of the hinge lever 11. The end-side, first contour 19 of the hinge lever 11 corresponds with a convex, second contour (not shown in the drawing) of the spoiler blade 5, the shape of which contour is preferably complementary with respect to the first contour. It goes without saying that the reversed case of the contours which correspond to one another can also be provided, and this is accordingly likewise included by the invention.

Figure 5:
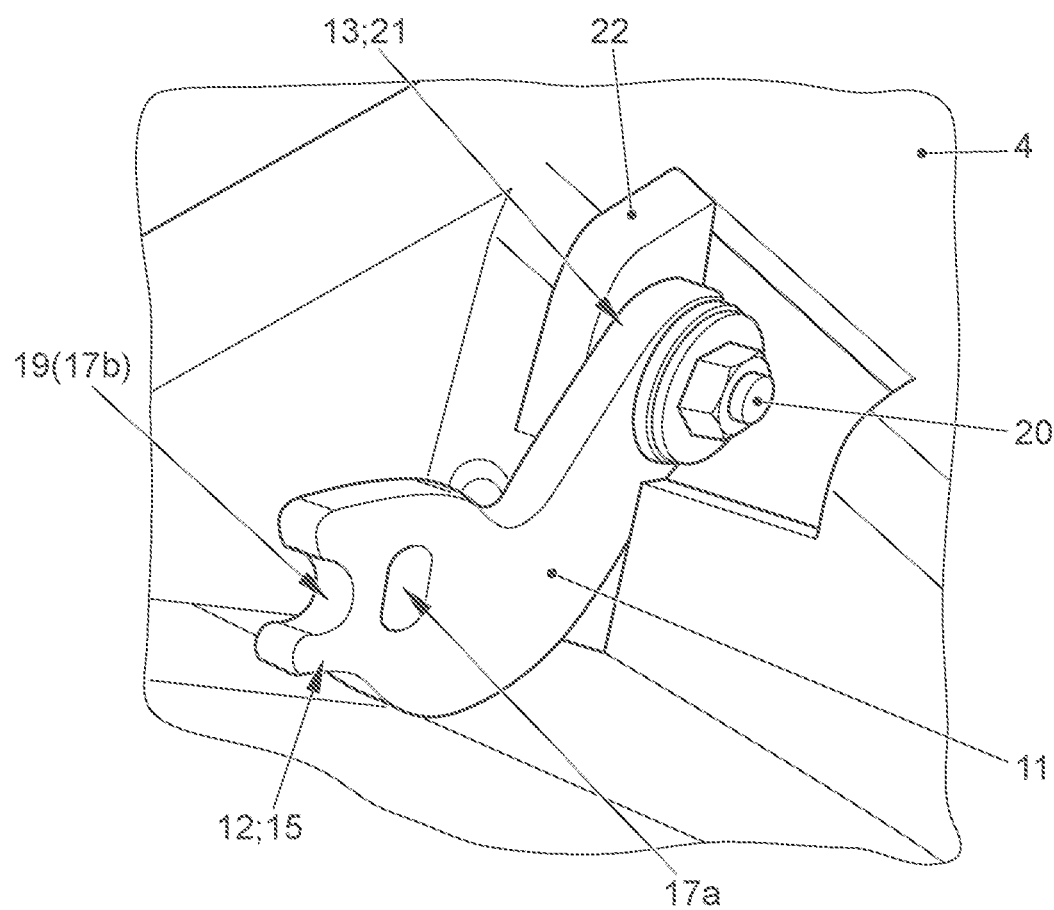
FIG. 5 shows a perspective detailed illustration of a hinge according to FIG. 4 in the installed state with a spoiler housing which is fixed on the body and supports the spoiler blade.

The rotatable mounting 13 of the hinge levers 11 on the spoiler housing 4 is brought about according to FIGS. 4 and 5 by means of in each case one bearing pin 20 which penetrates both a bore (not shown in the drawing) in the second end 21 of the hinge lever 11 and a bore (not shown in the drawing) in a bearing seat 22 in the spoiler housing 4. The bearing pins 20 are arranged in the vehicle transverse axis 6 which has already been mentioned above.

Figure 6:
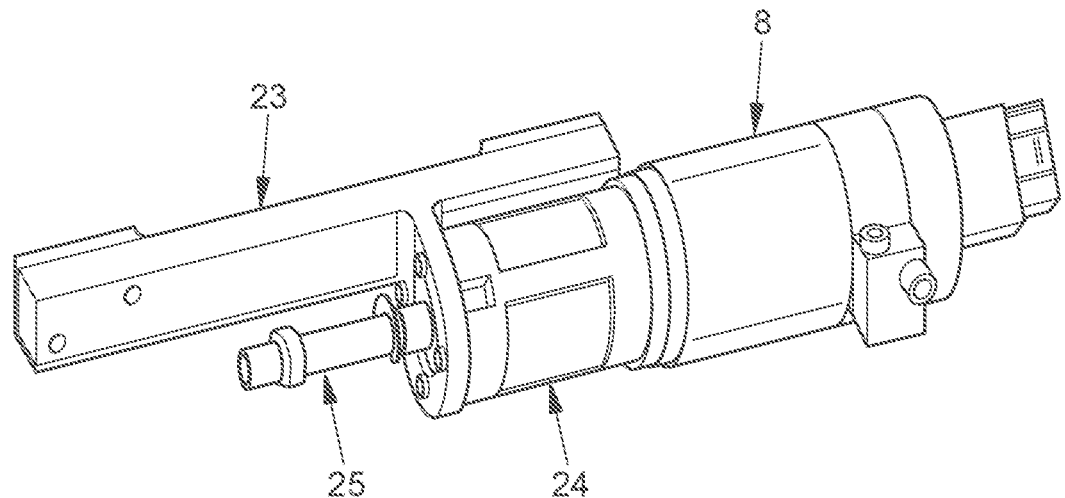
FIG. 6 shows a perspective individual illustration of an electric motor for driving the adjustable spoiler blade.

As far as the electric motor 8 is concerned, it is preferably fixed on the spoiler housing 4 between the two first bearing points 9 and 10 of the spoiler blade 5 via a holder 23. In accordance with this exemplary embodiment, the electric motor 8 has a planetary gear mechanism 24, the output shaft 25 of which is operatively connected via a toggle lever mechanism 26 to a second bearing point 27 of the spoiler blade 5, which second bearing point 27 is arranged centrally between the first bearing points 9, 10 (cf. FIGS. 3, 6 and 7). A compact overall design of the drive and a comparatively high torque with a low current consumption can be achieved by way of the use of the planetary gear mechanism 24. As a result of the step-down ratio of the planetary gear mechanism 24, the internal self-locking action thereof assists the system to counteract the deployed spoiler blade 5 from turning back into its basic position as a consequence of the air stream which acts on it.

Figure 7:
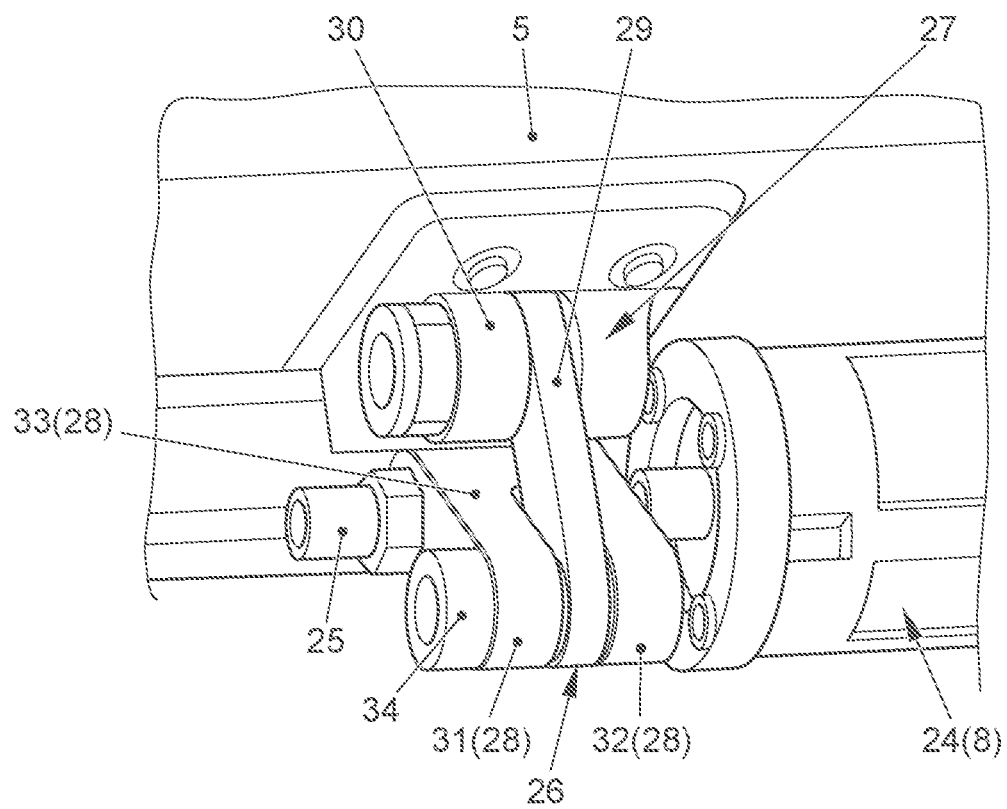
FIG. 7 shows a detailed illustration of the electric motor in an operative connection with the spoiler blade.

According to FIG. 7, said toggle lever mechanism 26 has a first lever 28 which is connected fixedly at one end to the output shaft 25 for conjoint rotation, which first lever 28 is connected in an articulated manner at the other end to an end of the second lever 29. The other end of the second lever 29 is connected in an articulated manner to the spoiler blade 5 at the second bearing point 27 of said spoiler blade 5. To this end, the spoiler blade 5 has a bearing seat 30 or configures a bearing seat 30 of this type in one piece. As can also be gathered from FIG. 7, the first lever 28 is configured in a U-profile shape with a web 33 which connects two side flanks 31, 32 among one another which are arranged spaced apart from one another. The web 33 has a bore (not shown in the drawing) for attaching the output shaft 25 fixedly for conjoint rotation. The side flanks 31, 32 have bores (not shown in the drawing) which correspond among one another for the articulated attachment of the second lever 29 by means of a pin 34. To this end, the second lever 29 is arranged between said side flanks 31, 32, and takes up the distance between them completely as far as possible without impeding the required joint agility.

The electric motor 8 is connected to an electronic control and regulating unit (ECU) which is not shown in the drawing, and can be regulated and controlled in defined steps or in an infinitely variable manner in a manner which is dependent on system parameters stored in software of said electronic control and regulating unit (ECU) and currently sensed driving states of the vehicle 1. In order for it to be possible for said regulating and control function of the electronic control and regulating unit (ECU) for the electric motor 8 and a safety function in the case of any malfunctions of the system to be recorded to be ensured sufficiently, the spoiler apparatus has means for displacement detection, such as potentiometers which are known per se and/or end stops, for example in the form of microswitches, for position detection of the spoiler blade 5, which means for displacement detection and/or end stops generate signals which are likewise made available to the control and regulating unit (ECU) for the evaluation and generation of regulating and control signals for the electric motor 8.

A suitable method for operating a spoiler apparatus of the above-described type is distinguished substantially by the fact that system parameters of the control and regulating unit (ECU) are designed in such a way that the adjustment of the spoiler blade 5 is carried out both in a speed-dependent manner and in accordance with the degree of retardation of the vehicle 1, at least one step for the driving operation of the vehicle 1 and, in addition, a further step in the case of maximum retardation of the vehicle 1 being provided with regard to an adjustment of the spoiler blade 5 in defined steps, an adjustment of the spoiler blade 5 from one step to the other, that is to say both to the higher step and to the lower step, taking place only when the relevant speed range is maintained for a predefined time of at least 5 seconds, and
  in the case where the vehicle 1 enters into an emergency braking situation with a maximum retardation, the adjustment of the spoiler blade 5 taking place directly into the further step independently of the current step to be recorded of the spoiler blade, which further step is associated with a maximum adjusting angle and a maximum air resistance.

Three steps however are preferably provided for the driving operation of the vehicle 1, however, in such a way that, in the range from the standstill of the vehicle 1 up to approximately 120 km/h driving speed of said vehicle, the spoiler blade 5 is situated in a first operating position which corresponds to the basic position thereof ("step 0"), that,
  between approximately 120 km/h and approximately 150 km/h, the angle of attack of the spoiler blade 5 is increased, and said spoiler blade 5 is situated in a second operating position which corresponds to a "step 1", that,
  between approximately 150 km/h and approximately 180 km/h, the angle of attack of the spoiler blade 5 is increased further, and said spoiler blade is situated in a third operating position which corresponds to a "step 2", and that,
  from 180 km/h, the angle of attack of the spoiler blade 5 is increased yet further, and said spoiler blade is situated in a third operating position which corresponds to a "step 3".

These are joined by the further step ("step 4") of the spoiler blade 5, which step is associated with a maximum adjusting angle and a maximum air resistance of said spoiler blade.

As has already been explained above, the above-described method has, in particular, also the advantage that, with regard to the feature indicated after the first dash, in the case of a "sporty" driving style, that is to say a driving style with a rapid and repetitive speed change, the adjustment of the spoiler blade 5 is reduced to a necessary minimum which leads to minimized wear of all the components.

In order to protect the system against damage, it is advantageously provided in one development of the method according to the invention that, in the case of an undefined deviation of the system from defined system parameters and stipulations, the adjustment of the spoiler blade 5 is stopped and the system is set into a "malfunction" mode. In combination with the above measure or on its own, it can be provided, furthermore, that the current consumption of the electric motor 8 is measured and evaluated continuously and, in the case of a deviation or a trend of a deviation of the measured values from predefined values, the adjusting system for the spoiler blade 5 is immediately switched off and is set into said "malfunction" mode. Advantageously, the "malfunction" mode is announced to the vehicle driver acoustically and/or visually in both cases. Causes of malfunctions of this type can be, for example, mechanical and/or electronic damage of system components or in the system, foreign bodies in the adjustment region of the spoiler blade 5 and/or the like.

The above-described exemplary embodiment of the invention is directed to a spoiler blade 5 which is mounted pivotably on said spoiler housing 4. The invention is not restricted to this specific embodiment of the spoiler apparatus 2, however, but rather also includes a spoiler apparatus 2 which has a spoiler blade 5 which is articulated in a pivotable manner directly on a body component of the vehicle 1, such as on the tailgate 3, on the vehicle roof or the like. In this case, a spoiler housing 4 can be dispensed with (not shown in the drawing). Moreover, the invention is not restricted to a spoiler apparatus 2 which is arranged in the roof region of the vehicle 1 on, for example, said tailgate 3 of the hatchback of the vehicle 1, but rather includes any suitable location for a spoiler apparatus 2 which is to be used as intended on the vehicle 1, for example directly on a roof of the vehicle body or on a hatch of a vehicle 1 which is configured with a notchback (not shown in the drawing).

LIST OF DESIGNATIONS

1 Vehicle
2 Spoiler apparatus
3 Tailgate
4 Spoiler housing
5 Spoiler blade
6 Vehicle transverse axis
7 Vehicle wheel
8 Electric motor
9 Bearing point (spoiler blade 5)
9*a* Hinge
10 Bearing point (spoiler blade 5)
10*a* Hinge
11 Hinge lever
12 Mounting
13 Mounting
14 Screw connection
15 First end (hinge lever 11)
16 Bearing seat (spoiler blade 5)
17*a* Means for positioning
17*b* Means for positioning
18 Fastening screw
19 Contour (hinge lever 11)
20 Bearing pin
21 Second end (hinge lever 11)
22 Bearing seat (spoiler housing 4)
23 Holder
24 Planetary gear mechanism
25 Output shaft
26 Toggle lever mechanism
27 Bearing point (spoiler blade 5)
28 First lever
29 Second lever
30 Bearing seat (spoiler blade 5)
31 Side flank
32 Side flank
33 Web
34 Pin

The invention claimed is:

1. A spoiler apparatus for a vehicle, the spoiler apparatus comprising:
a spoiler blade extending in a vehicle transverse direction, and being mounted for pivoting about a vehicle transverse axis on a vehicle body or a spoiler housing that is fixed on the vehicle;
said spoiler blade having two ends, each with a first bearing point at which said spoiler blade is pivotally mounted to the vehicle body or the spoiler housing;
hinges configured to pivotally mount each of said two ends of said spoiler blade on the vehicle body or the spoiler housing which is fixed on the vehicle, each of said hinges being an arcuate hinge lever with one end rotatably mounted to the vehicle body or the spoiler housing which is fixed on the vehicle and at another end non-rotatably mounted to said spoiler blade;
an electric motor for actively transferring said spoiler blade from a first operating position into at least one second operating position, and vice versa;
said electric motor being fixed on the vehicle body or on the spoiler housing between said first bearing points, as viewed in the vehicle transverse direction; and
a toggle lever mechanism operatively connecting said electric motor to said spoiler blade at a second bearing point of said spoiler blade.

2. The spoiler apparatus according to claim 1, wherein said toggle lever mechanism has a first lever which is connected at one end non-rotatably to an output shaft, said first lever is connected at another end in an articulated manner to an end of a second lever, and another end of said second lever is connected in an articulated manner to said spoiler blade at said second bearing point of said spoiler blade.

3. The spoiler apparatus according to claim 2, wherein said first lever has a U-shape with a web that connects two side flanks that are spaced from one another, said web being formed with a bore for non-rotatably attaching said output shaft, and said side flanks being formed with mutually corresponding bores for an articulated connection of said second lever by way of a pin.

4. The spoiler apparatus according to claim 1, wherein said other end of said hinge lever is disposed to face said spoiler blade and to be connected non-rotatably to said spoiler blade by way of a screw connection, and includes at least one positioning device for positioning said hinge lever relative to said spoiler blade.

5. The spoiler apparatus according to claim 4, wherein said positioning device is formed by a slot formed in said hinge lever for said screw connection to said spoiler blade and by way of an end-side, concave, first contour of said hinge lever, which first contour corresponds with a convex, second contour of said spoiler blade.

6. The spoiler apparatus according to claim 4, wherein said positioning device is formed by a slot formed in said hinge lever for said screw connection to said spoiler blade and by way of an end-side, convex, first contour of said hinge lever, which first contour corresponds with a concave, second contour of said spoiler blade or vice versa.

7. The spoiler apparatus according to claim 1, wherein said electric motor is connected to an electronic control unit, and said electric motor is configured by closed-loop or open-loop control in defined steps or infinitely variably in dependence on system parameters which are stored in software of said electronic control unit and on currently sensed driving states of the vehicle.

8. The spoiler apparatus according to claim 7, further comprising means for displacement detection and/or end stops for position detection of said spoiler blade, said means for displacement detection and/or end stops being configured to generate signals that are fed to said control unit for an evaluation and generation of control signals for said electric motor.

9. A vehicle, comprising a spoiler apparatus according to claim 1.

10. The vehicle according to claim 9, being a motor vehicle.

11. A method for operating a spoiler apparatus according to claim 1, the method comprising:
controlling the spoiler apparatus with a control and regulating unit in accordance with system parameters that are designed in such a way that an adjustment of the spoiler blade is carried out both in a speed-dependent manner and in accordance with a degree of retardation of the vehicle, and adjusting the spoiler blade in defined steps, with at least one step for a driving operation of the vehicle and a further step in a case of a maximum retardation of the vehicle, and thereby:
adjusting the spoiler blade between steps, including from a higher step to a lower step and from a lower step to a higher step, only when a relevant speed range has been maintained for a predefined time of at least 5 seconds;

when the vehicle enters into an emergency braking situation with a maximum retardation, adjusting the spoiler blade directly into a further step that is associated with a maximum adjusting angle and a maximum air resistance, independently of a current step to be recorded of the spoiler blade.

12. The method according to claim 11, which comprises:

operating the spoiler device with at least three steps defined for a driving operation of the vehicle, wherein:

in a range from standstill of the vehicle up to approximately 120 km/h driving speed of the vehicle, the spoiler blade is situated in a first operating position being a basic position;

in a range between approximately 120 km/h and approximately 150 km/h, an angle of attack of the spoiler blade is increased, and the spoiler blade is situated in a second operating position being a "step 1";

in a range between approximately 150 km/h and approximately 180 km/h, the angle of attack of the spoiler blade is increased further, and the spoiler blade is situated in a third operating position being a "step 2"; and in a range above 180 km/h, the angle of attack of the spoiler blade is increased yet further, and the spoiler blade is situated in a third operating position being a "step 3".

13. The method according to claim 11, which comprises:

in a case of an undefined deviation of the system from defined system parameters and stipulations, stopping an adjustment of the spoiler blade and setting the system into a "malfunction" mode; and/or continuously measuring and evaluating a current consumption of the electric motor and, in a case of a deviation or a trend of a deviation of the measured values from predefined values, immediately switching off an adjusting system for the spoiler blade and setting the system into the "malfunction" mode; and announcing the "malfunction" mode to a vehicle driver acoustically or visually in either case.

* * * * *